United States Patent
Kolchinsky et al.

(10) Patent No.: US 11,016,977 B2
(45) Date of Patent: May 25, 2021

(54) SYSTEM AND METHOD FOR DETECTING A PATTERN OF EVENTS

(71) Applicant: Technion Research & Development Foundation Limited, Haifa (IL)

(72) Inventors: Ilya Kolchinsky, Ashdod (IL); Assaf Schuster, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 373 days.

(21) Appl. No.: 16/044,529

(22) Filed: Jul. 25, 2018

(65) Prior Publication Data

US 2020/0034467 A1 Jan. 30, 2020

(51) Int. Cl.
*G06F 16/00* (2019.01)
*G06F 16/2455* (2019.01)
*G06F 16/22* (2019.01)
*G06F 16/2453* (2019.01)

(52) U.S. Cl.
CPC .... *G06F 16/24568* (2019.01); *G06F 16/2246* (2019.01); *G06F 16/2456* (2019.01); *G06F 16/24542* (2019.01)

(58) Field of Classification Search
CPC .......... G06F 16/24568; G06F 16/2246; G06F 16/2456; G06F 16/24542; G06F 21/552
USPC ....................................................... 707/769
See application file for complete search history.

(56) References Cited

U.S. PATENT DOCUMENTS

| 10,733,371 | B1* | 8/2020 | Baloga | G06F 3/04815 |
|---|---|---|---|---|
| 2006/0136368 | A1* | 6/2006 | Young-Lai | G06F 16/244 |
| 2006/0167865 | A1* | 7/2006 | Andrei | G06F 16/24544 |
| 2008/0059439 | A1* | 3/2008 | Fan | G06F 16/86 |
| 2008/0301135 | A1* | 12/2008 | Alves | G06F 16/2453 |
| 2009/0070313 | A1* | 3/2009 | Beyer | G06F 16/24 |
| 2010/0057735 | A1* | 3/2010 | Srinivasan | G06K 9/62 |
| | | | | 707/E17.014 |
| 2010/0191720 | A1* | 7/2010 | Al-Omari | G06F 16/24542 |
| | | | | 707/718 |
| 2010/0235347 | A1* | 9/2010 | Chaudhuri | G06F 16/24542 |
| | | | | 707/713 |
| 2012/0072412 | A1* | 3/2012 | Bestgen | G06F 16/24549 |
| | | | | 707/714 |
| 2012/0079464 | A1* | 3/2012 | De Smet | G06F 8/427 |
| | | | | 717/143 |
| 2014/0095472 | A1* | 4/2014 | Lee | G06F 16/24542 |
| | | | | 707/714 |
| 2015/0149435 | A1* | 5/2015 | McKenna | G06F 16/24544 |
| | | | | 707/714 |

(Continued)

*Primary Examiner* — Thanh-Ha Dang

(57) ABSTRACT

A method for detecting a pattern of events, comprising: receiving a template defining the pattern of events to detect; producing a join query for a relational database from the template; selecting a cost function for the join query, wherein a computation cost of the join query is equivalent to a computation cost of matching between a plurality of events from a plurality of streams of events and the template; identifying a preferred plan for executing the join query according to a minimal value of the cost function; producing an ordered set of a plurality of patterns, according to the preferred plan, by converting a plurality of database operations of the preferred plan into the ordered set of the plurality of patterns; and using the ordered set as an input for detecting a plurality of matches between the plurality of patterns and the plurality of events.

15 Claims, 6 Drawing Sheets

(56) References Cited

U.S. PATENT DOCUMENTS

2015/0286684 A1* 10/2015 Heinz ................. G06F 16/9024
                                                          707/769
2019/0236188 A1* 8/2019 McKenna ......... G06F 16/24544
2019/0266272 A1* 8/2019 Wolf ................. G06F 16/24549
2020/0142894 A1* 5/2020 Papaemmanouil .........................
                                                   G06F 16/24542

* cited by examiner

SYSTEM AND METHOD FOR DETECTING A PATTERN OF EVENTS

FIELD AND BACKGROUND OF THE INVENTION

The present invention, in some embodiments thereof, relates to a system for monitoring and tracking events of interest and, more specifically, but not exclusively, to a system for monitoring and tracking events of interest in massive data streams.

Complex event processing (CEP) refers to tracking and analyzing streams of information about things that happen, referred to as events, from multiple sources, and combining the streams of information from multiple sources to identify one or more meaningful events, for example an opportunity or a threat, and respond to the one or more meaningful events as quickly as possible. CEP methods are methods used for complex event processing.

A plurality of events from a source is called herein a stream of events. A stream of events may comprise a plurality of events received from a plurality of sources grouped together for purposes of processing. In some CEP systems some of the events are received from a sensor of a physical measurement, for example a temperature sensor, an air pressure sensor, or a time measuring device. In some CEP systems some of the events are received from a computer or a processor. A non-limiting list of examples of an event received from a computer or a processor comprises a text message, a social media post, a traffic report, a sales lead, and an order.

Some CEP systems receive one or more streams of events comprising a plurality of events, and inspect the plurality of received events to detect combinations of occurrences matching one or more predefined patterns. Examples of systems that may implement CEP methods include, but are not limited to, online finance systems, fraud detection systems, vehicle traffic management systems, and security systems.

SUMMARY OF THE INVENTION

It is an object of the present invention to provide a system and a method for detecting a pattern of events in a plurality of events from a plurality of streams of events.

The foregoing and other objects are achieved by the features of the independent claims. Further implementation forms are apparent from the dependent claims, the description and the figures.

According to a first aspect of the invention, method for detecting a pattern of events comprises: receiving a template defining the pattern of events to detect; producing a join query for a relational database from the template; selecting a cost function for the join query, wherein a computation cost of the join query is equivalent to a computation cost of matching between a plurality of events from a plurality of streams of events and the template; identifying a preferred plan for executing the join query according to a minimal value of the cost function; producing an ordered set of a plurality of patterns, according to the preferred plan, by converting a plurality of database operations of the preferred plan into the ordered set of the plurality of patterns; and using the ordered set as an input for detecting a plurality of matches between the plurality of patterns and the plurality of events.

According to a second aspect of the invention, a system for detecting a pattern of events comprises at least one hardware processor adapted to: receiving a template defining the pattern of events to detect; producing a join query for a relational database from the template; selecting a cost function for the join query, wherein a computation cost of the join query is equivalent to a computation cost of matching between a plurality of events from a plurality of streams of events and the template; identifying a plan for executing the join query according to a minimal value of the cost function; producing an ordered set of a plurality of patterns, according to the plan by converting a plurality of database operations of the plan into the ordered set of the plurality of patterns; and using the ordered set as an input for detecting a plurality of matches between the plurality of patterns and the plurality of events.

Converting the template defining the pattern of events into the join query and converting the plan for executing the join query into the ordered set of the plurality of patterns allows using methods known in the art to identify a preferred plan of execution for detecting the pattern of events the plurality of events by detecting a plurality of matches. A preferred plan identified according to the present invention may facilitate one or more of reduced cost of computation, higher throughput, and lower detection latency when detecting the pattern of events, and thus may reduce cost of operation and increase accuracy of a detection system.

With reference to the first and second aspects, in a first possible implementation of the first and second aspects of the present invention, the template is a pure conjunctive pattern such that the pattern of events comprises: a plurality of event operands connected by an AND operator, each event operand having an event type selected from a predefined plurality of event types, each of the predefined plurality of event types having an arrival rate and associated with a plurality of event attributes of respective event operand; a time interval value; and a plurality of conjunction predicates, each including a first event operand of the plurality of event operands and a second event operand of the plurality of event operands and having a selectivity value, indicative of a probability of the first event operand and the second event operand satisfying the conjunction predicate within the time interval value. Optionally, producing the join query comprises generating a query template comprising: a plurality of tables, each table corresponding to an event type of the predefined plurality of event types, each table comprising a plurality of columns, each column associated with one of the plurality of event attributes associated with the event type, and having a cardinality value equal to multiplying the time interval value by the event type's respective arrival rate; a plurality of relationship predicates, each relationship predicate including a first table of the plurality of tables and a second table of the plurality of tables and equivalent to an equivalent conjunction predicate such that the equivalent conjunction predicate's first event operand has a first event type corresponding to the first table and the equivalent conjunction predicate's second event operand has a second event type corresponding to the second table, and having a relationship selectivity value equal to the equivalent conjunction predicate's selectivity value; a join query SELECT clause comprising selecting all columns; a join query FROM clause comprising the plurality of tables; and a join query WHERE clause comprising a plurality of AND operands between the plurality of relationship predicates. Optionally, the plurality of database operations comprises an ordered set of database operations each selected from a group consisting of a join operation and a select operation, and converting the plurality of database operations of the preferred plan into the ordered set of the plurality of patterns comprises: producing a plurality of patterns by: for each join operation of the plurality of database operations, selecting a conjunctive predicate of the plurality of conjunctive predicates including a first event operand having a first event type corresponding with a first table of the join operation and a second event operand having a second event type corresponding with a second table of the join operation; for each select operation of the plurality of database operations producing a pattern comprising an event operand of the plurality of event operands having an event type corresponding to a table of the select operation; and ordering the plurality of patterns according to respective order of database operations in the ordered set of database operations. Optionally, the preferred plan for executing the join query is identified from a plurality of plans of execution, each comprising a tree of join operators having a plurality of nodes, such that a plurality of leaf nodes of the plurality of nodes represent each a table of the plurality of tables, and a plurality of internal nodes of the plurality of nodes represent each a table generated by joining the one or more tables represented by one or more children of the internal node. Mapping an event type into a relational database table having a plurality of columns matching the event type's plurality of event attributes, mapping an event's arrival rate into a respective relational database table's cardinality, creating a relationship predicates equivalent to a conjunctive predicate of the pattern of event, and mapping a conjunctive predicate's selectivity value into a selectivity value of respective relationship predicate may facilitate an association between a preferred plan of execution for the produced join query and a preferred plan of evaluation of the pattern of events, thus facilitating identification of a preferred plan of evaluation of the pattern of events using join query optimization methods.

With reference to the first and second aspects, or the first implementation of the first and second aspects, in a second possible implementation of the first and second aspects of the present invention, the cost function for the join query is defined such that computation of the cost function for the join query using one of the plurality of plans of execution comprises: computing a sum of a first plurality of cardinality values, each a cardinality value of one of the plurality of tables, to produce a leaves cost term; computing a plurality of internal cost terms by computing an internal cost term in each of a plurality of iterations by: selecting an internal node from the plurality of internal nodes; identifying a relevant sub-tree of the tree of join operators having a root node equal to the internal node and comprising a plurality of relevant nodes; selecting a plurality of relevant leaf nodes from the plurality of relevant nodes; selecting a plurality of relevant predicates from the plurality of relationship predicates, each having a first table represented by a first relevant node in the plurality of relevant leaf nodes and a second table represented by a second relevant node in the plurality of relevant leaf nodes; computing a product of a plurality of relevant selectivity values of the plurality of relevant predicates to produce an internal selectivity term; computing a product of a second plurality of cardinality values, each a cardinality value of one of the plurality tables, each represented by one of the plurality of relevant leaf nodes, to produce an internal cardinality term; and multiplying the internal selectivity term by the internal cardinality term to produce the internal cost term; and computing a sum of the plurality of internal cost terms and the leaves cost term. Such a function may be used to select a preferred plan of execution according to an amount of partial matches coexisting in memory within the time interval.

With reference to the first and second aspects, or the first implementation of the first and second aspects, in a third possible implementation of the first and second aspects of the present invention, the tree of join operators of each of the plurality of plans of execution is a left-deep tree, such that each of the plurality of plans of execution comprises an ordered list of joined tables comprising the plurality of tables indicating an order of execution of a plurality of join operations between the plurality of tables; and wherein the cost function for the join query is defined such that computation of the cost function for the join query using one of the plurality of plans of execution comprises: computing a plurality of cost terms by computing a cost term in each of a plurality of iterations by: in a first of the plurality of iterations: multiplying a first cardinality value of a first joined table of the ordered list by a relationship selectivity value of a first relationship predicate of the plurality of relationship predicates including a first table equal to the first joined table and a second table equal to the first joined table, to produce a first cost term of the plurality of cost terms; setting an accumulation join cost value to zero; adding the first join table to a list of previously joined tables; and identifying the first join table as a previous join table; and in each of a plurality of other iterations of the plurality of iterations: selecting a next join table consecutive to the previous join table in the ordered list; adding the next join table to the list of previously joined tables; computing a product of a plurality of cardinality values, each a cardinality value of one of the list of previously joined tables, to produce a cardinality term; selecting a relevant plurality of relationship predicates from the plurality of relationship predicates, each having a first table selected from the list of previously joined tables and a second table selected from the list of previously joined tables such that the first table was added to the list of previously joined tables no later than the second table; computing a product of a relevant plurality of selectivity values of the plurality of relevant predicates to produce a selectivity term; and multiplying the cardinality term by the selectivity term to produce a new cost term of the plurality of cost term; and computing a sum of the plurality of cost terms. Such a function may be used to select a preferred plan of execution according to an amount of partial matches coexisting in memory within the time interval in a system where a preferred plan of execution is limited to being an ordered set of patterns arranged in a sequence of patterns.

With reference to the first and second aspects, or the first implementation of the first and second aspects, in a fourth possible implementation of the first and second aspects of the present invention, the method further comprises: receiving a complex template defining the pattern of events to detect; converting the complex template into at least one pure conjunctive pattern before producing the join query; and producing a plurality of join queries by using each of the at least one converted pure conjunctive pattern as the template for producing the join query. Converting the complex template into one or more conjunctive templates may facilitate identifying according to the present invention a minimal cost execution plan for matching the complex pattern to the plurality of events. Optionally, the complex template comprises the plurality of event operands connected by a SEQUENCE operator defining an event order between the plurality of event operands, the plurality of conjunction predicates, and the time interval value, and converting the complex template into a pure conjunctive pattern comprises: connecting the plurality of event operands by an AND operator; producing a plurality of temporal predicates, each receiving a true value when a first timestamp value of a timestamp event attribute of a first event operand of the plurality of event operands is less than a second timestamp value of a timestamp event attribute of a second event operand immediately following the first event operand in the plurality of event operands according to the event order; and adding the plurality of temporal predicates to the plurality of conjunction predicates. Optionally, the complex template comprises the plurality of event operands connected by an AND operator, at least one Kleene closure (KL) operator applied to at least one event type of at least one event operand of the plurality of event operands, a conjunctive predicate having a true value, and the time interval value, and converting the complex template into a pure conjunctive pattern comprises: replacing in the plurality of event operands each of the at least one event type by respective converted event type having a respective converted arrival rate computed by: multiplying the arrival rate of respective event type by the time interval value to produce an exponent; raising two to the power of the exponent to produce a power term; and dividing the power term by the time interval value. Optionally, the complex template comprises the plurality of event operands connected by a first plurality of AND and OR operators, the plurality of conjunction predicates, and the time interval value, and converting the complex template into a pure conjunctive pattern comprises converting the first plurality of AND and OR operators in to a second plurality of AND operators conforming to a disjunctive normal form comprising a plurality of pure conjunctive patterns.

With reference to the first and second aspects, in a fifth possible implementation of the first and second aspects of the present invention, at least one of the plurality of streams of events is received by the at least one hardware processor from at least one sensor connected to the at least one hardware processor. Optionally, the at least one sensor is connected to the at least one hardware processor via at least one digital communication network interface connected to the at least one hardware processor. Optionally, the at least one sensor is selected from a group of sensors comprising: a digital camera, a digital video camera, a microphone, a temperature sensor, an electromagnetic radiation sensor, and a pressure sensor. Connecting a plurality of sensors to the at least one hardware processor via at least one digital network interface may facilitate concurrent detection of a pattern of events in a plurality of events from a plurality of streams of events received from a plurality of locations, and thus may reduce latency of detection of the pattern of events. Optionally, at least one of the plurality of streams of events is received by the at least one hardware processor from at least one other hardware processor connected to the at least one hardware processor via at least one digital communication network interface. Receiving a stream of events from at least one other hardware processor may facilitate detection of a pattern of events comprising an event that requires computation, such as detection of an object in a digital image.

With reference to the first and second aspects, in a sixth possible implementation of the first and second aspects of the present invention, the at least one hardware processor is further adapted to output an indication of detecting the plurality of matches. Optionally, the at least one hardware processor outputs the indication by at least one of: sending at least one message indicative of detecting the plurality of matches via at least one other digital communication network interface, and storing data indicative of detecting the plurality of matches in at least one non-volatile digital storage connected to the at least one hardware processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
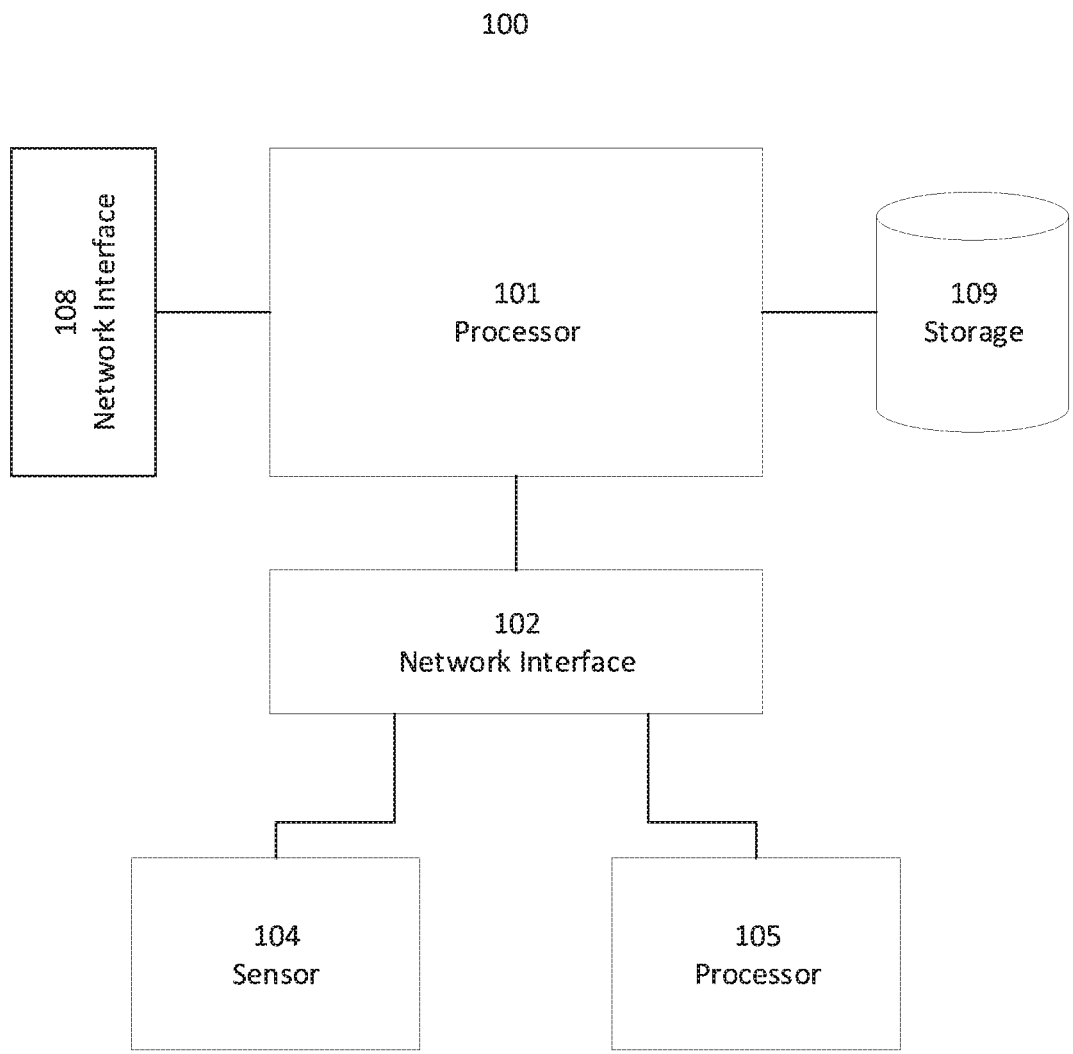
FIG. 1 is a schematic block diagram of an exemplary system, according to some embodiments of the present invention.

The present invention, in some embodiments thereof, relates to a system for monitoring and tracking events of interest and, more specifically, but not exclusively, to a system for monitoring and tracking events of interest in massive data streams. In some systems this processing is done in real time, as the streams of events are received. Complex event processing has become increasingly important for applications in which the one or more streams of events arrive at high speeds, and arbitrarily complex patterns must be efficiently detected as the one or more streams of events are received, thus there is a need to reduce processing time of processing the plurality of event streams.

Pattern detection generally consists of collecting a plurality of events and combining the plurality of events into one or more partial matches using a predefined detection model. As additional events are added to a partial match, a full pattern match is eventually formed and optionally reported. Detection models used in existing CEP methods include non-deterministic finite automata, finite state machines and event processing networks.

Henceforth the term "CEP engine" is used to mean a system for detecting a pattern of events using one or more CEP methods.

A CEP engine may create an internal representation of a pattern of events to be monitored, based on a detection model. Examples of a representation are a tree and an automaton. A tree is an acyclic connected graph having a plurality of nodes, where any two nodes are connected by exactly one path. The representation reflects a structure of the pattern. Some CEP engines use a cost-based evaluation plan, where a plurality of representations of the pattern of events are possible, and one is chosen according to a user's preference or a predefine cost metric. Such an evaluation plan comprises a possible order of evaluation of a plurality of patterns, such that the combined evaluation of the plurality of patterns in the possible order may result in a full pattern match between the pattern of events and the plurality of streams of events. The order may not be fully sequential, for example the order may have a tree structure where one or more evaluations may be performed in parallel. Using a cost-based evaluation plan may facilitate choosing an evaluation plan more efficient than another possible evaluation plans. An amount of possible representations of the pattern of events increases as amount of the plurality of patterns comprising the pattern of events increases. Typically, the amount of possible representations increases at least exponentially with relation to the amount of the plurality of patterns, thus identifying a corresponding evaluation plan having an optimal cost may be a complex task. Some existing methods to identify a preferred execution plan for a CEP system include using simulation based techniques to estimate a cost of evaluating an execution plan. Simulation may require a considerable amount of computation resources, and by nature may not depict an exact real cost of evaluating the execution plan.

A similar problem exists in the field of relational databases, where there is a need to identify a preferred plan of execution of a large join query. Executing a join query comprises using a plurality of database operations to combine a plurality of relations of the relational database while satisfying a plurality of relational constraints. Identifying a preferred plan of execution of a join query comprises identifying an order of executing the plurality of database operations such that an identified database cost function is minimized. Existing methods for identifying a preferred execution plan of a join query include greedy heuristic techniques, exhaustive dynamic programming techniques and randomized and genetic algorithms.

The present invention, in some embodiments thereof, proposes using a similarity between estimating a cost of a CEP execution plan and estimating a cost of an execution plan for a large join query in a relational database to identify a preferred execution plan in a CEP system.

In a CEP system, a pattern of events may be defined by a template comprising a combination of a plurality of primitive events (each represented by an event operand) and a plurality of operators, a plurality of predicates to be satisfied by the plurality of event operands and a time window value. Each event operand may have an event type and a plurality of event attributes. In some CEP systems, a plurality of events in one stream of events has a common event type. A timestamp is an example of an event attribute. The time window value defines a maximal allowed difference between a time stamp attribute value of one event operand and a time stamp attribute value of a second event operand matching the event pattern. In another example, where the event type is a financial transfer, the event type's plurality of event attributes may comprise an originator of the transfer, a receiver of the transfer, and an amount of money. In yet another example, where the event type is detection of a vehicle in a digital image, the event type's plurality of event attributes may comprise a vehicle type, a vehicle color, a vehicle's dimensions, and a vehicle license plate number. Some of the plurality of operators describes an event relation between one and more of the plurality of event operands. Some other of the plurality of operators describes an event relation with itself. For example, an AND operator describes an event relation where all of one or more of the plurality of event operands occur within a time window defined by the time window value. A SEQUENCE operator describes an event relation where all of the one or more of the plurality of event operands occur in a predefined order within the time window defined by the time window value. An OR operator describes an event relation where any one of the one or more of the plurality of events operands occur within the time window defined by the time window value. A NOT operator describes an absence of an event operand of the plurality of event operands. A Kleene closure (KL) operator describes a plurality of event sequences of one or more event operands of an event type, occurring within the time window defined by the time window value. The plurality of predicates specifies one or more constraints on one or more event attribute values of one or more of the plurality of event operands. A match is detected between the pattern of events and a plurality of events of a plurality of streams of events when the plurality of events are received within the time window value, comprise the plurality of event operands, and a plurality of event attribute values of the event operands satisfy the plurality of predicates.

As detailed below, in some embodiments of the present invention a template describing a pattern of events is converted to an equivalent join query template for a relational database. In addition, in such embodiments a cost function for the join query is selected such that a computation cost of a join query, defined by the join query template, according to the cost function is equivalent to a computation cost of matching between a plurality of events from a plurality of streams of events and the template. Optionally, a preferred plan of execution for executing the join query is identified according to a minimal value of the cost function, optionally using methods as known in the art. The preferred plan optionally comprises a plurality of database operations. Optionally the plurality of database operations are selected from a group of possible database operations comprising a join operation and a select operation. Next, the plurality of database operations of the preferred plan is converted into an ordered set of a plurality of patterns. The ordered set of the plurality of patterns may then be used by a CEP system to detect the pattern of events in a plurality of events from a plurality of streams of events.

Using an execution plan to detect the pattern of events produced according to the present invention may increase a throughput of a CEP system compared to another CEP system using an execution plan produced using other methods such as simulation methods. In addition or alternately, using an execution plan to detect the pattern of events produced according to the present invention may reduce cost of computation to detect the pattern of events compared to using an execution plan produced using other methods, for example by reducing am amount of operations required to detect the pattern of events.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments of the present invention. In such embodiments, at least one hardware processor 101 is connected to at least one digital communication network interface 102 for the purpose of receiving a plurality of streams of events from at least one sensor 104. Optionally, at least one hardware processor 101 receives some of the plurality of streams of events from at least one other processor 105 via at least one digital communication network interface. At least one digital communication network interface 102 optionally connects to a Local Area Network (LAN), for example an Ethernet network or a wireless network such as a Wireless Fidelity (WiFi) network. Optionally, at least one digital communication network interface 102 connects to a Wide Area Network (WAN), for example the Internet. Optionally, at least one sensor 104 is directly connected to at least one hardware processor 101. Some examples of sensors are a digital camera, a digital video camera, a microphone, a temperature sensor, an electromagnetic radiation sensor, and a pressure sensor. Optionally, upon detecting a pattern of events for example by detecting a plurality of matches, at least one hardware processor 101 outputs an indication of detecting the plurality of matches. Optionally at least one hardware processor 101 is connected to at least one other digital communication network interface 108 for the purpose of sending at least one message indicative of detecting the plurality of matches, for example to at least one management hardware processor. Optionally, at least one hardware processor 101 is connected to at least one non-volatile digital storage 109, for the purpose of storing on at least one non-volatile digital storage 109 data indicative of detecting the plurality of matches. Examples of non-volatile digital storage are a hard disk drive, a network storage device, and a storage network. Optionally, for example when the non-volatile digital storage is a network storage device, at least one non-volatile digital storage 109 is connected to at least one hardware processor 101 via at least one digital network interface 108. Optionally, at least one digital network interface 108 is at least one digital network interface 102. Optionally, at least one hardware processor 101 is couple with digital memory, for example Random Access Memory (RAM). Optionally the digital memory is non-volatile, for example Non Volatile Random Access Memory (NVRAM).

To detect a pattern of events, in some embodiments of the present invention system 100 implements the following optional method.

Figure 2:
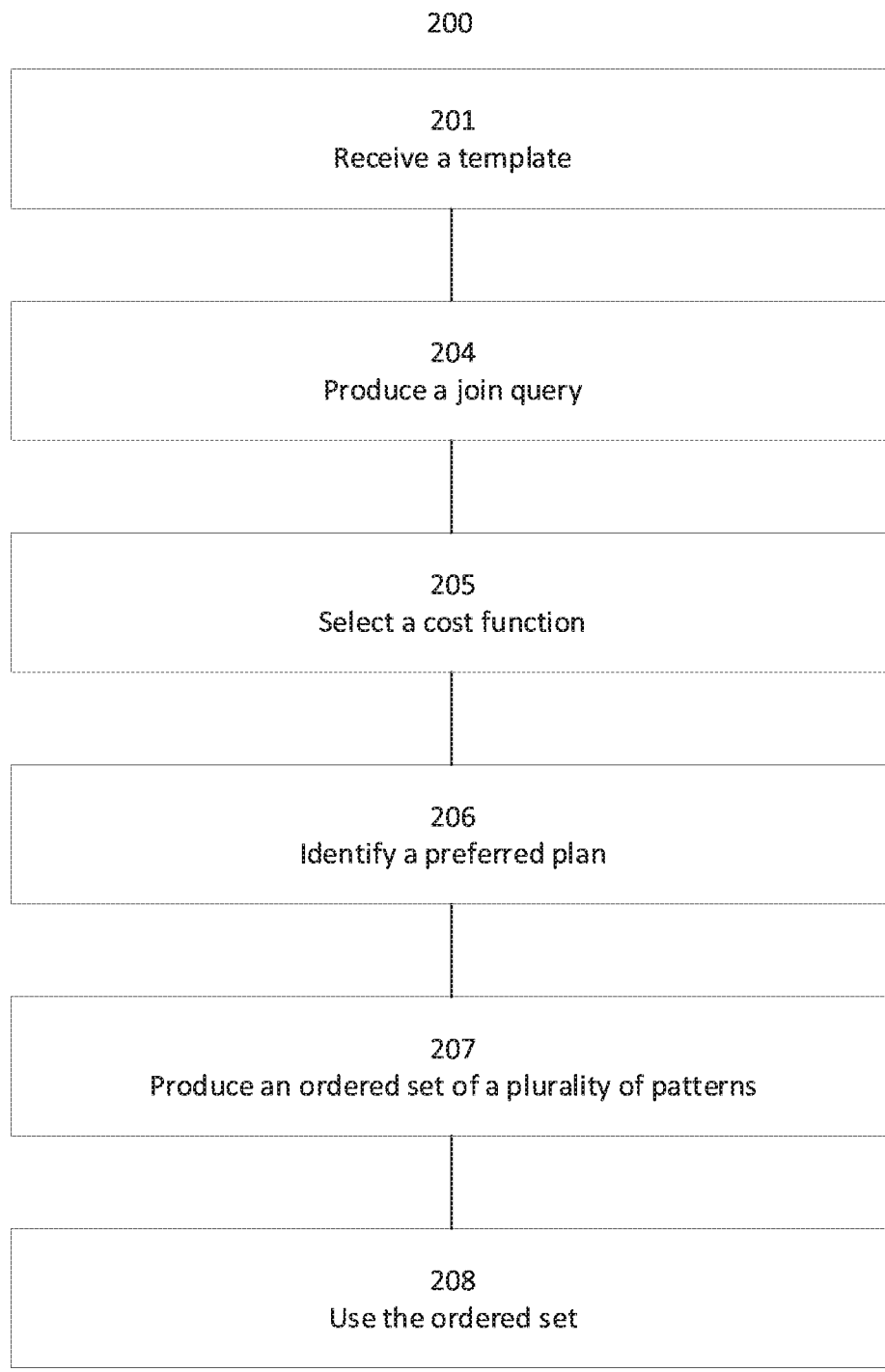
FIG. 2 is a flowchart schematically representing an optional flow of operations for detecting a pattern of events, according to some embodiments of the present invention.

Reference is now made also to FIG. 2, showing a flowchart schematically representing an optional flow of operations 200 for detecting a pattern of events, according to some embodiments of the present invention. In such embodiments, at least one hardware adapter receives in 201 a template defining the pattern of events to detect. Optionally, the template is a pure conjunctive pattern, comprising a plurality of event operands connected by an AND operator. Optionally, each event operand has an event type selected from a predefined plurality of event types. Examples of an event type are an audio signal captured by a microphone, a result of processing an audio signal, an indication of detecting a predefined object in a digital image, and a financial transfer. Each of the predefined plurality of event types optionally has an arrival rate, describing an average or expected amount of events arriving in a predefined amount of time. Optionally, each of the predefined plurality of event types is associated with a plurality of event attributes of respective event operand. Optionally, each of the plurality of events operands has a plurality of event attribute values of the plurality of event attributes. An example of an event attribute is a timestamp, for example of a time of event generation or of a time of event reception by at least one hardware processor 101. Other examples of event attributes are an originator of a financial transfer, a receiver of a financial transfer, an amount of money, a vehicle type, a vehicle color, a vehicle's dimensions, and a vehicle license plate number. Optionally, the template comprises a time interval value, defining a maximum difference between an earliest timestamp event attribute value of a plurality of timestamp event attribute values of the plurality of event operands and a latest timestamp event attribute value of the plurality of timestamp event attribute values. Optionally, the template comprises a plurality of conjunction predicates, each including a first event operand of the plurality of event operands and a second event operand of the plurality of event operands. Optionally, each of the plurality of conjunction predicates defines one or more constraints on one or more event attribute values of the first event operand and the second event operand. Optionally, each pf the plurality of conjunction predicates has a selectivity value indicative of a probability of the first event operand and the second event operand satisfying the conjunction predicate within a time interval having duration of the time interval value.

Optionally, a pure conjunctive pattern is defined as follows:
PATTERN AND $(T_1 e_1, \ldots, T_n e_n)$
WHERE $(c_{1,1} \wedge c_{1,2} \wedge \ldots c_{n-1,n} \wedge c_{n,n})$
WITHIN W
Where:
n denotes an amount of event operands,
$e_1 \ldots e_n$ denote the plurality of event operands,
$T_1 \ldots T_n$ denote respective event types of the plurality of event operands, selected from the predefined plurality of event types,
$c_{1,1}, c_{1,2}, \ldots c_{n-1,n}, c_{n,n}$ denote the plurality of conjunction predicates such that $c_{i,j}$ denotes a conjunction predicate between a first event operand denoted by $e_i$ and a second event operand denoted by $e_j$, and
W denotes the time interval value.
In addition:
$s_{i,j}$ denotes the selectivity value of a conjunction predicate denoted by $c_{i,j}$, indicative of a probability of a partial match containing a first event operand $e_i$ having an event type $T_i$ and a second event operand $e_j$ having an event type $T_j$ satisfying $c_{i,j}$, and
$r_i$ denotes an arrival rate of respective event type denoted by $T_i$.
Optionally, $s_{i,j}$ is a value in the range between 0 and 1, inclusive of 0 and 1.

Optionally, an expected amount of events of type $T_i$ received by at least one hardware processor 101 within a time interval having a duration of W is $W \cdot r_i$.

For brevity and clarity, henceforth the term "table" is used to mean a relation, also known as a table, of a relational database.

Referring again to FIG. 2, in some embodiments of the present invention at least one processor 101 produces in 204 a join query for a relational database from the template. Optionally, producing the join query comprises generating a query template. Optionally, the query template comprises a plurality of tables, each table corresponding to an event type of the plurality of event types, each table comprising a plurality of columns, each column associated with one of the plurality of event attributes associated with the event type and having a cardinality value equal to multiplying the time interval value by the event type's respective arrival rate. Optionally the query template comprises a plurality of relationship predicates, each relationship predicate including a first table of the plurality of tables and a second table of the plurality of tables and equivalent to an equivalent conjunction predicate such that the equivalent conjunction predicate's first event operand has a first event type corresponding to the first table and the equivalent conjunction predicate's second event operand has a second event type corresponding to the second table, and having a relationship selectivity value equal to the equivalent conjunction predicate's selectivity value. Optionally, the query template comprises a join query SELECT clause comprising selecting all columns, a join query FROM clause comprising the plurality of tables, and a join query WHERE clause comprising a plurality of AND operands between the plurality of relationship predicates.

Optionally, the query template is defined as follows:
SELECT *
FROM $R_1, \ldots R_n$
WHERE $(rc_{1,1} \wedge rc_{1,2} \wedge \ldots rc_{n-1,n} \wedge rc_{n,n})$
Where:
$R_1 \ldots R_n$ denote the plurality of tables, corresponding to respective $T_1 \ldots T_n$, and
$rc_{1,1}, rc_{1,2}, \ldots rc_{n-1,n}, rc_{n,n}$ denote the plurality of relationship predicates such that $rc_{i,j}$ denotes a conjunction predicate between a first table denoted by $R_i$ and a second table denoted by $R_j$ and equivalent to respective $c_{i,j}$.

As uses herein, the term "cardinality" refers to an amount of rows in a table of a relational database. The cardinality of $R_i$ is $W \cdot r_i$.

A selectivity of a relationship predicate $rc_{i,j}$ is denoted by $f_{i,j}$. If no relationship predicate $rc_{i,j}$ exists, $f_{i,j}$ is defined to equal 1, otherwise $f_{i,j}$ is defined to be equal to respective $s_{i,j}$.

Referring again to FIG. 2, in 205 at least one hardware processor 101 optionally selects a cost function for the join query. Optionally, a computation cost of the join query is equivalent to a computation cost of matching between a plurality of events from a plurality of streams of events and the template. Optionally, an execution plan for the join query comprises a tree of join operators having a plurality of nodes. In such a tree of join operators, a leaf node is a node having no children, and an internal node is a node having at least one child. Optionally, a plurality of leaf nodes of the plurality of nodes represent each a table of the plurality of tables, and a plurality of internal nodes of the plurality of nodes represent each a table generated by joining the one or more tables represented by one or more children of the internal node. At least one hardware processor 101 may select a cost function as known in the industry, reflecting one or more identified cost metrics, for example an amount of memory, and an amount of database operations. Following is a description of some possible cost functions. In some embodiments at least one hardware processor 101 selects a cost function defined for the respective embodiment.

In some embodiments of the present invention at least one hardware processor 101 is constrained to use an order-based evaluation plan to detect the pattern of events, where a plurality of patterns are evaluated in a defined sequential order denoted by O, such that $O=(T_{p1}, T_{p2} \ldots T_{p_n})$ where $p_i \in [1, n]$. In such embodiments, a possible cost function for detecting the pattern of events reflects a number of partial matches coexisting in the digital memory coupled with at least one hardware processor 101. Computation of such a cost function may be based on a plurality of arrival rates of the plurality of events from the plurality of streams of events and on a plurality of selectivity values of the plurality of conjunctive predicates.

Optionally, during pattern evaluation according to O, an expected amount of partial matches of length k, where $1 \leq k \leq n$, is denoted by PM(k) and given by:

$$PM(k) = W^k \cdot \prod_{i=1}^{k} r_{p_i} \cdot \sum_{i,j \leq k; i \leq j} s_{p_i, p_j}$$

Thus, optionally a cost function of matching between a plurality of events of a plurality of streams of events and the pattern, using sequential order O, is denoted by $Cost_{ord}(O)$ and given by:

$$Cost_{ord}(O) = \sum_{k=1}^{n} \left( W^k \cdot \prod_{i=1}^{k} r_{p_i} \cdot \sum_{i,j \leq k; i \leq j} s_{p_i, p_j} \right)$$

An order-based evaluation plan to detect the pattern of events is equivalent to using a join query execution plan comprising a left-deep tree of join operators. A left-deep tree is a deep tree where each inner node has at least one child that is a leaf node and at most one child that is not a leaf node. When the join query plan comprises a left-deep tree of join operators, each internal node of the plurality of internal nodes represents a join operation between one of the plurality of tables and either another of the plurality of tables or a table generated by another join operation. Thus, at least one hardware processor 101 is optionally constrained to identify a preferred plan for executing the join query from a plurality of join query execution plans each comprising a left-deep tree of join operators.

|R| denotes a cardinality of a table denoted by R. A possible cost function for executing a join query computes an amount of intermediate tuples produced during execution of the join query execution plan according to the join query's execution plan. Optionally, a cost of joining two tables denoted by Ri and $R_j$ is denoted by $C(Ri, R_j)$ and is defined by:

$$C(R_i, R_j) = |R_i| \cdot |R_j| \cdot f_{i,j}$$

L denotes a left-deep tree, and $\{i_1, i_2, \ldots i_n\}$ denotes an order in which input tables are to be joined according to left-deep tree L, $P_k$ denotes a result of joining the first k tables by L, and $C_1$ denotes a cost of an initial selection from table $R_{i_1}$ and is optionally computed by:

$$C_1 = |R_i| \cdot f_{i_1, i_1}$$

A cost of executing the join query execution plan according to L is denoted by $Cost_{LDJ}(L)$ and may be given by:

$$Cost_{LDJ}(L) = C_1 + \sum_{k=2}^{n} C(P_{k-1}, R_{i_k})$$

By opening the recursion in $Cost_{LDJ}(L)$ and substituting some parameters with equivalent parameters of the pattern of events we get that $Cost_{LDJ}(L)$ is equal to $Cost_{ord}(O)$, and specifically:

$$Cost_{ord}(O) = Cost_{LDJ}(L) = |R_i| \cdot f_{i_1, i_1} + \sum_{k=2}^{n} \left( \prod_{j=1}^{k} |R_i| \cdot \sum_{j, l \leq k; j \leq l} f_{i_j, i_l} \right)$$

Optionally, in 205 at least one hardware processor selects a cost function of an execution plan of a join query comprising an ordered list of joined tables comprising the plurality of tables indicating an order of execution of a plurality of join operations between the plurality of tables.

Figure 3:
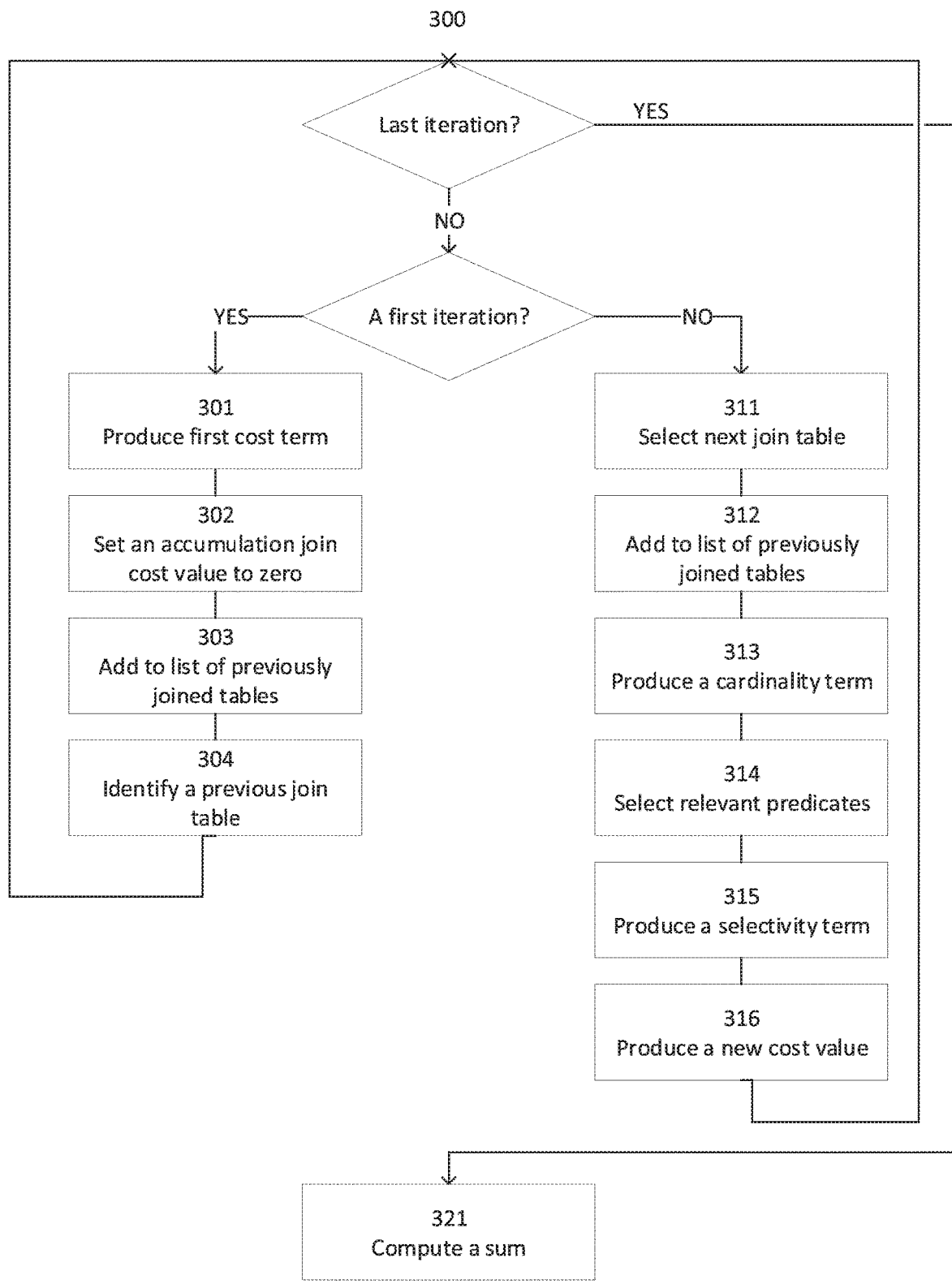
FIG. 3 is a flowchart schematically representing an optional flow of operations for computing a cost function for a left-deep tree solution, according to some embodiments of the present invention.

Reference is now made also to FIG. 3, showing a flowchart 300 schematically representing an optional flow of operations for computing a cost function for a left-deep tree solution, according to some embodiments of the present invention. In such embodiments, the cost function at least one hardware processor selects in 205 is such that computing the cost function for a join query comprising an ordered list of joined tables comprises computing a plurality of cost terms by computing a cost term in each of a plurality of iterations as follows. In a first of the plurality of iterations, in 301 a first cost term of the plurality of cost terms is optionally produced by multiplying a first cardinality value of a first joined table of the ordered list by a relationship selectivity value of a first relationship predicate of the plurality of relationship predicates including a first table equal to the first joined table and a second table equal to the first joined table. In 302 an accumulation join cost value is optionally set to zero, in 303 the next join table is optionally added to a list of previously joined tables and in 304 the first join table is optionally identified as a previous join table, for following iterations.

Next, in each of a plurality of other iterations of the plurality of iterations, in 311 a next join table, consecutive to the previous join table in the ordered list, is optionally selected, and in 312 the next join table is optionally added to the list of previously joined tables. In 313, a cardinality term is optionally produced, optionally by computing a product of a plurality of cardinality values, each a cardinality value of one of the list of previously joined tables. In 314, a relevant plurality of relationship predicates is optionally selected from the plurality of relationship predicates, optionally such that each of the relevant predicates has a first table selected from the list of previously joined tables and a second table selected from the list of previously joined tables such that the first table was added to the list of previously joined tables no later than the second table, and in 315 a selectivity term is optionally produced by computing a product of a relevant plurality of selectivity values of the plurality of relevant predicates. In 306, a new cost term of the plurality of cost terms is optionally produced by multiplying the cardinality term by the selectivity term. After producing the plurality of cost terms, in 321 a computational cost value is optionally computed by computing a sum of the plurality of cost terms.

In some embodiments of the present invention at least one hardware processor 101 is not constrained to use an order-based evaluation plan to detect the pattern of events. In such embodiments, in such embodiments the order of evaluation is non-sequential and has a bushy tree structure where one or more evaluations may be performed in parallel. In such embodiments the bushy tree structure of the plan of execution comprises a plurality of leaf nodes, each collecting events of one of the plurality of event types. For a leaf node denoted by 1 collecting events of type $T_i$, an expected amount of partial matches is denoted by PM(l) and is equal to an amount of events of type $T_i$ arriving inside a time interval having a duration of the time interval value: PM(l)= $W \cdot r_i$. To compute an estimate of an expected amount of partial matches in an internal node of the bushy tree, a cost function value of each of the internal node's plurality of children nodes may be multiplied by total selectivity of a plurality of verified predicates selected from the plurality of conjunctive predicates, verified by the internal node. Opening the recursion yields a cost function on a bushy tree T denoted by $\text{Cost}_{tree}(T) = \Sigma_{N \in nodes(T)} PM(N)$.

A non-sequential evaluation plan to detect the pattern of events is equivalent to using a join query execution plan comprising a bushy join tree of join operators. Thus, at least one hardware processor 101 may identify a preferred plan for executing the join query from a plurality of join query execution plans each comprising a tree of join operations without any constraints on a topology of the tree. A cost function of evaluating a tree node denoted by JN in the busy join tree is denoted by C(JN) and is optionally defined by:

$$C(JN) = \begin{cases} |R_i| & JN \text{ is a leaf representing } R_i \\ |L||R|f_{L,R} & JN \text{ is an internal node} \\ & \text{representing} \\ & \text{a join between } L \text{ and } R \end{cases}$$

Optionally, a cost function for executing a join query according to an execution plan comprising a tree denoted by JT, is denoted by $\text{Cost}_{BJ}(JT)$ and is a sum of a plurality of cost functions of a plurality of nodes of JT:

$$\text{Cost}_{BJ}(JT) = \sum_{JN \in nodes(JT)} C(JN)$$

By opening and substituting some parameters with equivalent parameters of the pattern of events we get that $\text{Cost}_{tree}(T)$ is equal to $\text{Cost}_{BJ}(JT)$, and specifically:

$$\text{Cost}_{tree}T = \text{Cost}_{BJ}(JT)$$

$$= \sum_{i=1}^{n} |R_i| + \sum_{JN \in internal\_nodes(JT)} \left( \prod_{m \in leaves(JN)} R_m \cdot \prod_{i,j \in leaves(JN)} f_{i,j} \right)$$

Optionally, in 205 at least one hardware processor selects a cost function of an execution plan of a join query comprising a set of joined tables comprising the plurality of tables indicating an order of execution of a plurality of join operations between the plurality of tables. The order of execution may be sequential and may be non-sequential.

Figure 4:
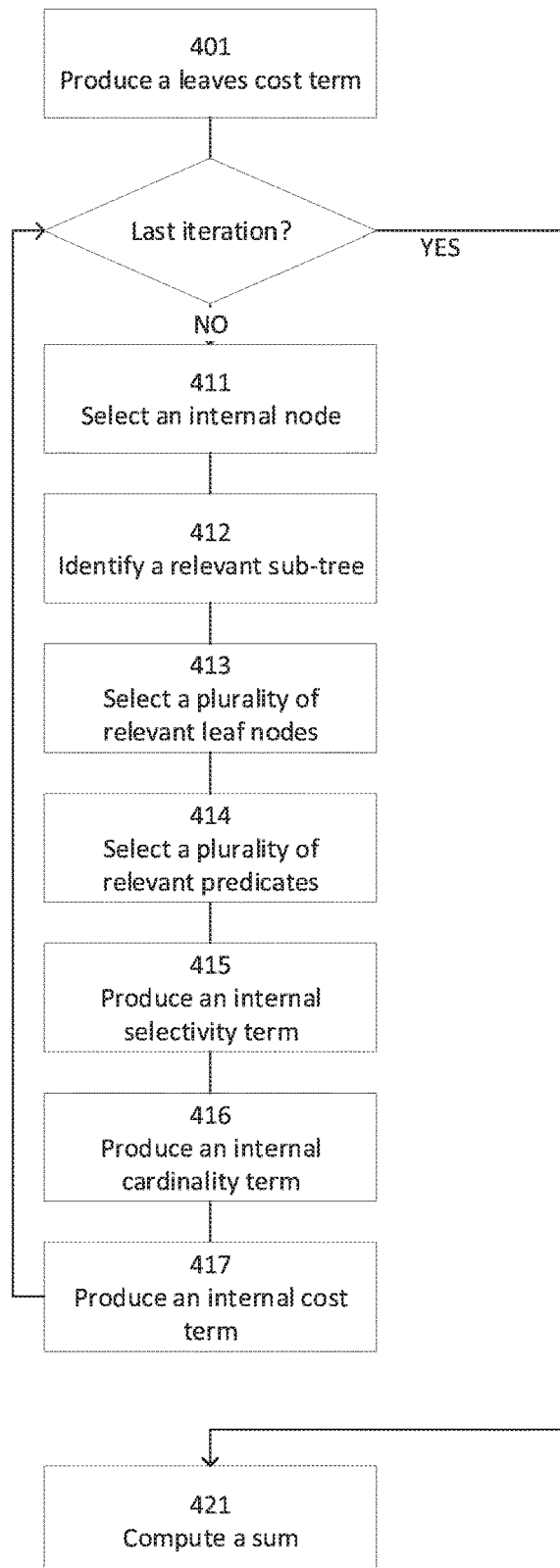
FIG. 4 is a flowchart schematically representing an optional flow of operations for computing a cost function for a general tree solution, according to some embodiments of the present invention.

Reference is now made also to FIG. 4, showing a flowchart schematically representing an optional flow of operations 400 for computing a cost function for a general tree solution, according to some embodiments of the present invention. In such embodiments, the cost function at least one hardware processor selects in 205 is such that computing the cost function for a join query comprising a tree of joined operations comprises producing in 401 a leaves cost term by computing a sum of a first plurality of cardinality values, each a cardinality value of one of the plurality of tables. Optionally, a plurality of internal cost terms is computed by computing an internal cost term in each of a plurality of iterations as follows. In 411, an internal node is optionally selected from the plurality of internal nodes and in 412 a relevant sub-tree of the tree of join operators is optionally identified such that the relevant sub-tree has a root node equal to the selected internal node and the relevant sub-tree comprises a plurality of relevant leaf nodes. Optionally, in 413 a plurality of relevant leaf nodes is selected from the plurality of relevant nodes, and in 414 a plurality of relevant predicates is optionally selected from the plurality of relationship predicates, each having a first table represented by a first relevant node in the plurality of relevant leaf nodes and a second table represented by a second relevant node in the plurality of relevant leaf nodes. In 415, an internal selectivity term is optionally produced by computing a product of a plurality of relevant selectivity values of the plurality of relevant predicates. Optionally, in 416 an internal cardinality term is produced by computing a product of a second plurality of cardinality values, each a cardinality value of one of the plurality tables, each represented by one of the plurality of leaf nodes, and in 417 the internal cost term of the plurality of internal cost terms is optionally produced by multiplying the internal selectivity term by the internal cardinality term. After producing the leaves cost term and the plurality of internal cost terms, in 421 a computational cost value is optionally computed by computing a sum of the plurality of internal cost terms and the leaves cost term.

Reference is now made again to FIG. 2. In 206, at least one hardware processor optionally identifies a preferred plan for executing the join query according to a minimal value of the cost function selected in 205. Optionally, the preferred plan for executing the join query is identified from a plurality of plans of execution, each comprising a tree of join operators having a plurality of nodes, such that the plurality of leaf nodes of the plurality of nodes represent each a table of the plurality of tables, and a plurality of internal nodes of the plurality of nodes represent each a table generated by joining the one or more tables represented by one or more children of the internal node. Optionally, at least one hardware processor executes a join query plan generation method as known in the art to identify the preferred plan for executing the join query. Such a join query plan generation method may receive as input the join query and the cost function and return a preferred plan for evaluating the join query according to a minimal value of the cost function.

In 207, at least one hardware processor 101 optionally produces an ordered set of a plurality of patterns, according to the preferred plan, by converting a plurality of database operations of the preferred plan into the ordered set of the plurality of patterns. Optionally, each of the plurality of database operations is selected from a group comprising a join operation and a select operation.

Figure 5:
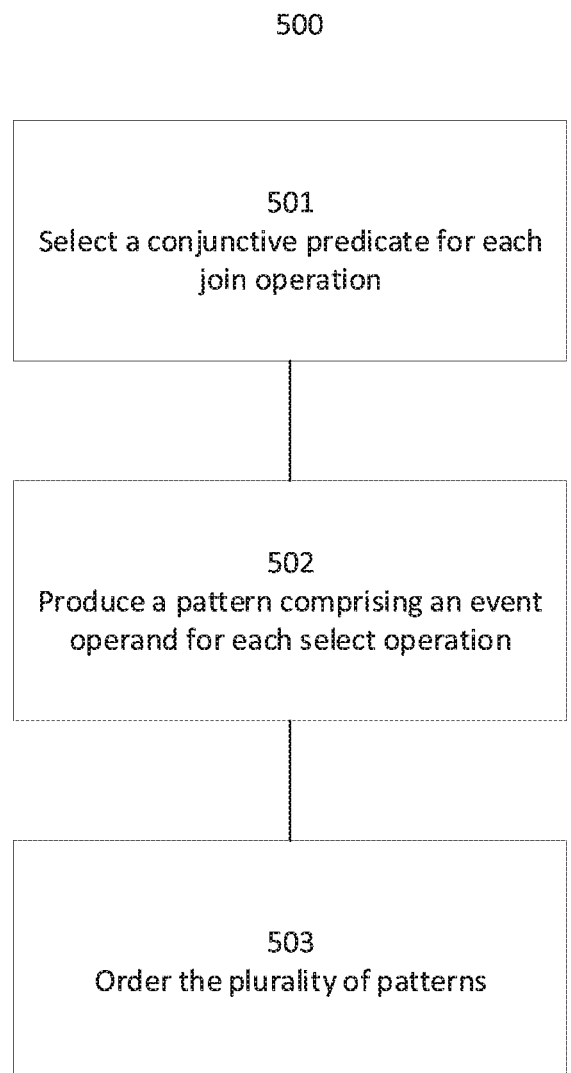
FIG. 5 is a flowchart schematically representing an optional flow of operations for converting a join query plan of execution, according to some embodiments of the present invention.

Reference is now made also to FIG. 5, showing a flowchart schematically representing an optional flow of operations 500 for converting a join query plan of execution, according to some embodiments of the present invention. In such embodiments, at least one hardware processor 101 produces a plurality of patterns as follows. In 501 at least one hardware processor 101 optionally selects for each join operation of the plurality of database operations a conjunctive predicate of the plurality of conjunctive predicates including a first event operand having a first event type corresponding with a first table of the join operation and a second event operand having a second event type corresponding with a second table of the join operation. In 502, at least one hardware processor 101 optionally produces for each select operation of the plurality of database operations a pattern comprising an event operand of the plurality of event operands having an event type corresponding to a table of the select operation. After producing the plurality of patterns, in 503 at least one hardware processor 101 optionally orders the plurality of patterns according to respective order of database operations in the ordered set of database operations.

Reference is now made again to FIG. 2. In 208 at least one hardware processor 101 optionally uses the ordered set as an input for detecting a plurality of matches between the plurality of patterns and the plurality of events. Detecting the plurality of matches between the plurality of patterns and the plurality of events detects a match between the plurality of events from the plurality of streams of events and the template. Optionally, at least one hardware processor 101 uses the ordered set in a plurality of detection iterations, to detect one or more matches between the plurality of events from the plurality of streams of events, for example when the plurality of events are received over a period of time significantly longer than the time interval of the template.

In some embodiments of the present invention the template is a complex template, i.e. the template is not a pure conjunctive template. In such embodiments, system 100 optionally implements the following method.

Figure 6:
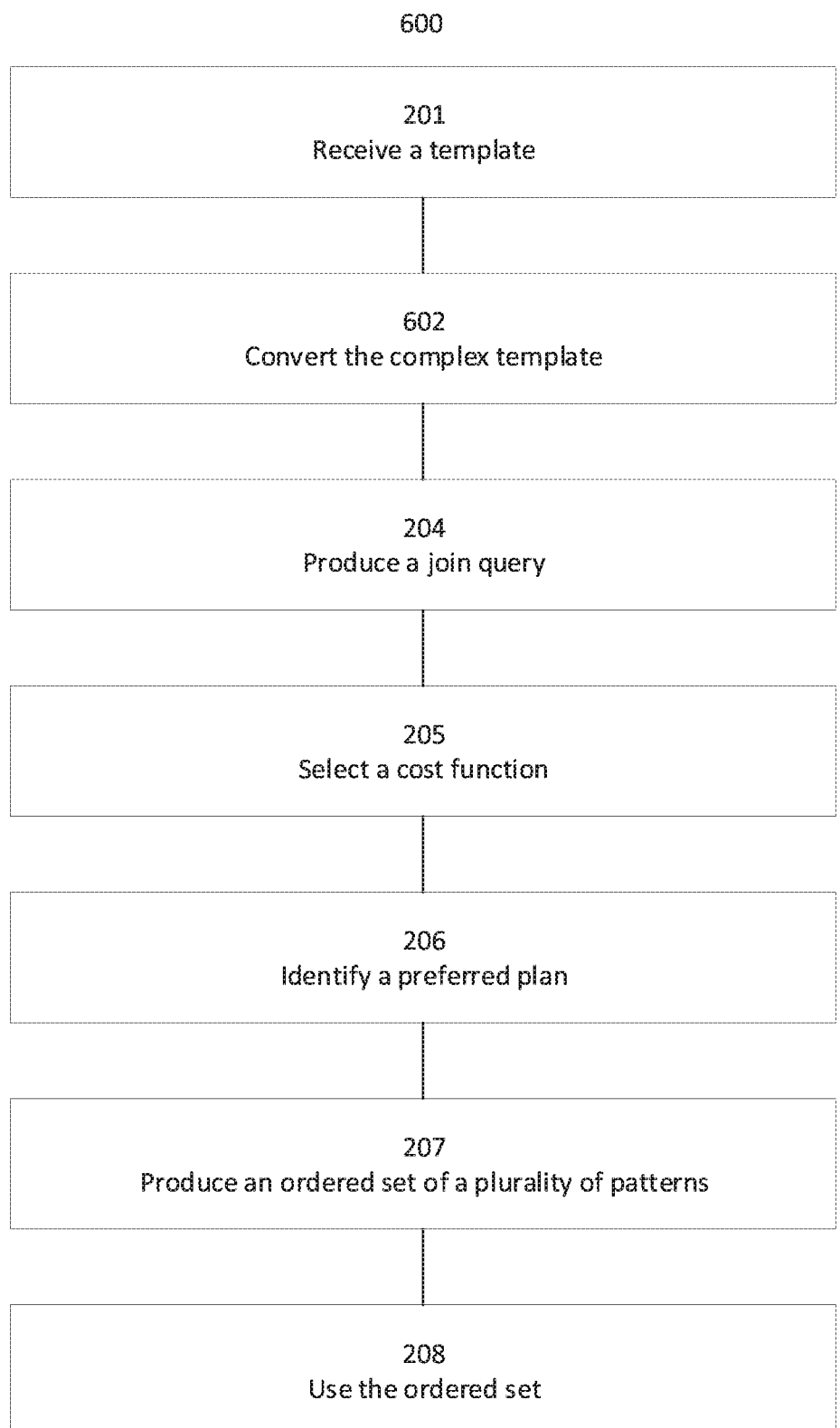
FIG. 6 is a flowchart schematically representing an optional flow of operations for detecting a complex pattern of events, according to some embodiments of the present invention.

Reference is now made to FIG. 6, showing a flowchart schematically representing an optional flow of operations 600 for detecting a complex pattern of events, according to some embodiments of the present invention. In such embodiments, at least one hardware processor receives in 201 a complex template defining the pattern of events to detect and in 602 optionally converts the complex template into one or more pure conjunctive patterns before producing the join query. Optionally, at least one hardware processor 101 uses each of the one or more pure conjunctive patterns as a template for producing the join query in 204, selecting the cost function in 205, identifying the preferred plan in 206, producing the ordered set of the plurality of patterns in 207 and using the ordered set in 208.

For example, in some embodiments the complex template comprises the plurality of event operands connected by a SEQUENCE operator, defining an event order between the plurality of event operands, instead of connected by an AND operator. In such embodiments, converting the complex template into a pure conjunctive pattern optionally comprises connecting the plurality of event operands by an AND operand, producing a plurality of temporal predicates, each receiving a true value when a first timestamp value of a timestamp event attribute of a first event operand of the plurality of event operands is less than a second timestamp value of a timestamp event attribute of a second event operand immediately following the first event operand in the plurality of event operands according to the event order, and adding the plurality of temporal predicates to the plurality of conjunction predicates.

In some embodiment of the present invention the complex template additionally comprises a KL operator applied to at least one event type of at least one event operand of the plurality of event operands. Optionally, the complex template comprises a conjunctive predicate having a true value. In such embodiments, converting the complex template into a pure conjunctive pattern comprises replacing in the plurality of event operands each of the at least one event type by respective converted event type having a respective converted arrival rate computed by multiplying the arrival rate of respective event type by the time interval value to produce an exponent, raising two to the power of the exponent to produce a power term, and dividing the power term by the time interval value. A resulting converted arrival rate is considerably higher than any other arrival rate of the plurality of event types, making it likely that processing events of the converted event type will be postponed to a last step of the preferred execution plan which is a desired strategy for evaluating the original complex pattern. After identifying the preferred plan, at least one hardware processor 101 optionally replaces each of the at least one converted event types in the preferred plan with respective at least one event type and optionally adds a KL operator in respective stage of the preferred plan.

In some embodiments of the present invention, the complex template comprises the plurality of event operands connected by a first plurality of AND and OR operators, instead of by an AND operator. In such embodiments, converting the complex template into a pure conjunctive pattern comprises converting the first plurality of AND and OR operators into a second plurality of AND operators conforming to a disjunctive normal form comprising a plurality of pure conjunctive patterns. The complex pattern is matched with the plurality of events from the plurality of streams of events according to a union of matches according to a plurality of execution plans produced from the plurality of pure conjunctive patterns.

In some embodiments of the present invention the complex patterns comprise a NOT operator applied to at least one of the plurality of event operands. According to the present invention, at least one hardware processor 101 identifies a positive part of the complex pattern and uses it as the pattern. After identifying the ordered set of the plurality of patterns, at least one hardware processor 101 adds one or more negation operations of the at least one event operands after all positive events of the at least one event operand have been received.

Reference is made again to FIG. 2. Detection latency, as used herein, is a time difference between an arrival time of a last event of a full pattern match and a reporting time of outputting an indication of the full pattern match detection. Some existing applications have real-time requirements and require reducing detection latency values. There is typically a tradeoff between a system's latency and a system's throughput, where improving one is at the expense of the other, as when an execution plan is optimized for maximal throughput, a last event in the pattern may not be a last event in the execution plan. After the last event in the pattern is accepted, the system still needs to execute additional parts of the plan, resulting in later detection of a full match. In some embodiments of the present invention, the cost function selected by at least one hardware processor 101 in 205 reflects an expected latency of executing a plan, and thus system 100 may be used to detect the pattern of events using an ordered set of patterns resulting in a minimal detection latency value.

There exist more than one event selection strategies, specifying how events are selected from the plurality of streams of events for a partial match. One existing strategy is skip-till-any-match, which permits an event to participate in an unlimited amount of matches with the pattern (full matches). A second existing strategy is skip-till-next-match, where an event appears in no more than a single full match. A third existing strategy is strict-contiguity where the plurality of events must be contiguous in the plurality of streams of events, i.e. no other events appear between the plurality of events, and a fourth existing strategy is partition-contiguity, a slightly relaxed version of strict-contiguity partitioning the plurality of streams of events according to an identified condition and requiring all events of the plurality of events located in a common partition to be contiguous. In some embodiments, the cost function selected by at least one hardware processor 101 in 205 reflects one or more constraints imposed by an event selection strategy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant event types will be developed and the scope of the term event types is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for detecting a pattern of events received in real time from a plurality of streams of events, comprising:

at a first hardware processor connected to a communication network:

receiving through said communication network from at least one source, a plurality of streams of events, said at least one source includes at least one of at least one sensor of a physical measurement and at least a second hardware processor;

in real time, during said receiving of said plurality of streams of events:

receiving a complex template defining the pattern of events to detect;

converting the complex template into at least one pure conjunctive pattern;

producing a plurality of join queries by using each of the at least one converted pure conjunctive pattern as a template for producing a join query;

producing said join query for a relational database from the template;

selecting a cost function for the join query, wherein a computation cost of the join query is equivalent to a computation cost of matching between a plurality of events from said plurality of streams of events and the template;

identifying a preferred plan, out of a plurality of possible plans, for executing the join query, said preferred plan is associated with a cost function having a minimal value when compared to the cost function associated with other ones of the plurality of possible plans;

producing an ordered set of a plurality of patterns, according to the preferred plan, by converting a plurality of database operations of the preferred plan into the ordered set of the plurality of patterns; and using the ordered set as an input for detecting a plurality of matches between the plurality of patterns and the plurality of events;

wherein the pattern of events comprises:
 a plurality of event operands connected by an AND operator, each event operand having an event type selected from a predefined plurality of event types, each of the predefined plurality of event types having an arrival rate and associated with a plurality of event attributes of respective event operand;
 at least one Kleene closure (KL) operator applied to at least one event type of at least one event operand of the plurality of event operands;
 a time interval value;
 a plurality of conjunction predicates, each including a first event operand of the plurality of event operands and a second event operand of the plurality of event operands and having a selectivity value, indicative of a probability of the first event operand and the second event operand satisfying the conjunction predicate within the time interval value; and
 at least one of said plurality of conjunctive predicates having a true value; and wherein converting the complex template into a pure conjunctive pattern comprises:
 replacing in the plurality of event operands each of the at least one event type by respective converted event type having a respective converted arrival rate computed by:
  multiplying the arrival rate of respective event type by the time interval value to produce an exponent;
  raising two to the power of the exponent to produce a power term; and
  dividing the power term by the time interval value.

2. The method of claim 1, wherein producing the join query comprises generating a query template comprising:
 a plurality of tables, each table corresponding to an event type of the predefined plurality of event types, each table comprising a plurality of columns, each column associated with one of the plurality of event attributes associated with the event type, and having a cardinality value equal to multiplying the time interval value by the event type's respective arrival rate;
 a plurality of relationship predicates, each relationship predicate including a first table of the plurality of tables and a second table of the plurality of tables and equivalent to an equivalent conjunction predicate such that the equivalent conjunction predicate's first event operand has a first event type corresponding to the first table and the equivalent conjunction predicate's second event operand has a second event type corresponding to the second table, and having a relationship selectivity value equal to the equivalent conjunction predicate's selectivity value;
 a join query SELECT clause comprising selecting all columns;
 a join query FROM clause comprising the plurality of tables; and
 a join query WHERE clause comprising a plurality of AND operands between the plurality of relationship predicates.

3. The method of claim 2, wherein the plurality of database operations comprises an ordered set of database operations each selected from a group consisting of a join operation and a select operation; and
 wherein converting the plurality of database operations of the preferred plan into the ordered set of the plurality of patterns comprises:
  producing a plurality of patterns by:
   for each join operation of the plurality of database operations, selecting a conjunctive predicate of the plurality of conjunctive predicates including a first event operand having a first event type corresponding with a first table of the join operation and a second event operand having a second event type corresponding with a second table of the join operation;
   for each select operation of the plurality of database operations producing a pattern comprising an event operand of the plurality of event operands having an event type corresponding to a table of the select operation; and
  ordering the plurality of patterns according to respective order of database operations in the ordered set of database operations.

4. The method of claim 1, wherein the preferred plan for executing the join query is identified from a plurality of plans of execution, each comprising a tree of join operators having a plurality of nodes, such that a plurality of leaf nodes of the plurality of nodes represent each a table of the plurality of tables, and a plurality of internal nodes of the plurality of nodes represent each a table generated by joining the one or more tables represented by one or more children of the internal node.

5. The method of claim 4, wherein the cost function for the join query is defined such that computation of the cost function for the join query using one of the plurality of plans of execution comprises:
 computing a sum of a first plurality of cardinality values, each a cardinality value of one of the plurality of tables, to produce a leaves cost term;
 computing a plurality of internal cost terms by computing an internal cost term in each of a plurality of iterations by:
  selecting an internal node from the plurality of internal nodes;
  identifying a relevant sub-tree of the tree of join operators having a root node equal to the internal node and comprising a plurality of relevant nodes;
  selecting a plurality of relevant leaf nodes from the plurality of relevant nodes;
  selecting a plurality of relevant predicates from the plurality of relationship predicates, each having a first table represented by a first relevant node in the plurality of relevant leaf nodes and a second table represented by a second relevant node in the plurality of relevant leaf nodes;
  computing a product of a plurality of relevant selectivity values of the plurality of relevant predicates to produce an internal selectivity term;
  computing a product of a second plurality of cardinality values, each a cardinality value of one of the plurality tables, each represented by one of the plurality of relevant leaf nodes, to produce an internal cardinality term; and multiplying the internal selectivity term by the internal cardinality term to produce the internal cost term; and computing a sum of the plurality of internal cost terms and the leaves cost term.

6. The method of claim 4, wherein the tree of join operators of each of the plurality of plans of execution is a left-deep tree, such that each of the plurality of plans of execution comprises an ordered list of joined tables comprising the plurality of tables indicating an order of execution of a plurality of join operations between the plurality of tables; and wherein the cost function for the join query is defined such that computation of the cost function for the join query using one of the plurality of plans of execution comprises:

computing a plurality of cost terms by computing a cost term in each of a plurality of iterations by:

in a first of the plurality of iterations:

multiplying a first cardinality value of a first joined table of the ordered list by a relationship selectivity value of a first relationship predicate of the plurality of relationship predicates including a first table equal to the first joined table and a second table equal to the first joined table, to produce a first cost term of the plurality of cost terms;

setting an accumulation join cost value to zero;

adding the first join table to a list of previously joined tables; and identifying the first join table as a previous join table; and in each of a plurality of other iterations of the plurality of iterations:

selecting a next join table consecutive to the previous join table in the ordered list;

adding the next join table to the list of previously joined tables;

computing a product of a plurality of cardinality values, each a cardinality value of one of the list of previously joined tables, to produce a cardinality term;

selecting a relevant plurality of relationship predicates from the plurality of relationship predicates, each having a first table selected from the list of previously joined tables and a second table selected from the list of previously joined tables such that the first table was added to the list of previously joined tables no later than the second table;

computing a product of a relevant plurality of selectivity values of the plurality of relevant predicates to produce a selectivity term; and multiplying the cardinality term by the selectivity term to produce a new cost term of the plurality of cost term; and computing a sum of the plurality of cost terms.

7. The method of claim 1, wherein the complex template comprises:

the plurality of event operands connected by a SEQUENCE operator defining an event order between the plurality of event operands;

the plurality of conjunction predicates; and the time interval value; and wherein converting the complex template into a pure conjunctive pattern comprises:

connecting the plurality of event operands by an AND operator;

producing a plurality of temporal predicates, each receiving a true value when a first timestamp value of a timestamp event attribute of a first event operand of the plurality of event operands is less than a second timestamp value of a timestamp event attribute of a second event operand immediately following the first event operand in the plurality of event operands according to the event order; and adding the plurality of temporal predicates to the plurality of conjunction predicates.

8. The method of claim 1, wherein the complex template comprises:

the plurality of event operands connected by a first plurality of AND and OR operators;

the plurality of conjunction predicates; and the time interval value; and wherein converting the complex template into a pure conjunctive pattern comprises:

converting the first plurality of AND and OR operators in to a second plurality of AND operators conforming to a disjunctive normal form comprising a plurality of pure conjunctive patterns.

9. A system for detecting a pattern of events received in real time from a plurality of streams of events, comprising:

at least one hardware processor connected to a communication network and adapted to:

receiving through said communication network from at least one source, a plurality of streams of events, said at least one source includes at least one of at least one sensor of a physical measurement and at least one other hardware processor;

in real time, during said receiving of said plurality of streams of events:

receiving a complex template defining the pattern of events to detect;

converting the complex template into at least one pure conjunctive pattern;

producing a plurality of join queries by using each of the at least one converted pure conjunctive pattern as a template for producing a join query;

producing said join query for a relational database from the template;

selecting a cost function for the join query, wherein a computation cost of the join query is equivalent to a computation cost of matching between a plurality of events from said plurality of streams of events and the template;

identifying a plan, out of a plurality of possible plans, for executing the join query, said plan is associated with a cost function having a minimal value when compared to the cost function associated with other ones of the plurality of plans;

producing an ordered set of a plurality of patterns, according to the plan by converting a plurality of database operations of the plan into the ordered set of the plurality of patterns; and using the ordered set as an input for detecting a plurality of matches between the plurality of patterns and the plurality of events;

wherein the pattern of events comprises:

a plurality of event operands connected by an AND operator, each event operand having an event type selected from a predefined plurality of event types, each of the predefined plurality of event types having an arrival rate and associated with a plurality of event attributes of respective event operand;

at least one Kleene closure (KL) operator applied to at least one event type of at least one event operand of the plurality of event operands;

a time interval value;

a plurality of conjunction predicates, each including a first event operand of the plurality of event operands and a second event operand of the plurality of event operands and having a selectivity value, indicative of a probability of the first event operand and the second event operand satisfying the conjunction predicate within the time interval value; and at least one of said plurality of conjunctive predicates having a true value; and wherein converting the complex template into a pure conjunctive pattern comprises:

replacing in the plurality of event operands each of the at least one event type by respective converted event type having a respective converted arrival rate computed by:

multiplying the arrival rate of respective event type by the time interval value to produce an exponent;

raising two to the power of the exponent to produce a power term; and dividing the power term by the time interval value.

10. The system of claim 9, wherein at least one of the plurality of streams of events is received by the at least one hardware processor from the at least one sensor connected to the at least one hardware processor through said communication network.

11. The system of claim 10, wherein the at least one sensor is connected to the at least one hardware processor via at least one digital communication network interface connected to the at least one hardware processor.

12. The system of claim 10, wherein the at least one sensor is selected from a group of sensors comprising: a digital camera, a digital video camera, a microphone, a temperature sensor, an electromagnetic radiation sensor, and a pressure sensor.

13. The system of claim 9, wherein at least one of the plurality of streams of events is received by the at least one hardware processor from the at least one other hardware processor connected to the at least one hardware processor via at least one digital communication network interface.

14. The system of claim 9, wherein the at least one hardware processor is further adapted to output an indication of detecting the plurality of matches.

15. The system of claim 14, wherein the at least one hardware processor outputs the indication by at least one of: sending at least one message indicative of detecting the plurality of matches via at least one other digital communication network interface, and storing data indicative of detecting the plurality of matches in at least one non-volatile digital storage connected to the at least one hardware processor.

* * * * *